March 2, 1943. H. M. KILPATRICK 2,312,340
CHECK CONTROLLED AND DISPENSING TURNSTILE AND OTHER DEVICE
Filed March 10, 1938 3 Sheets-Sheet 2
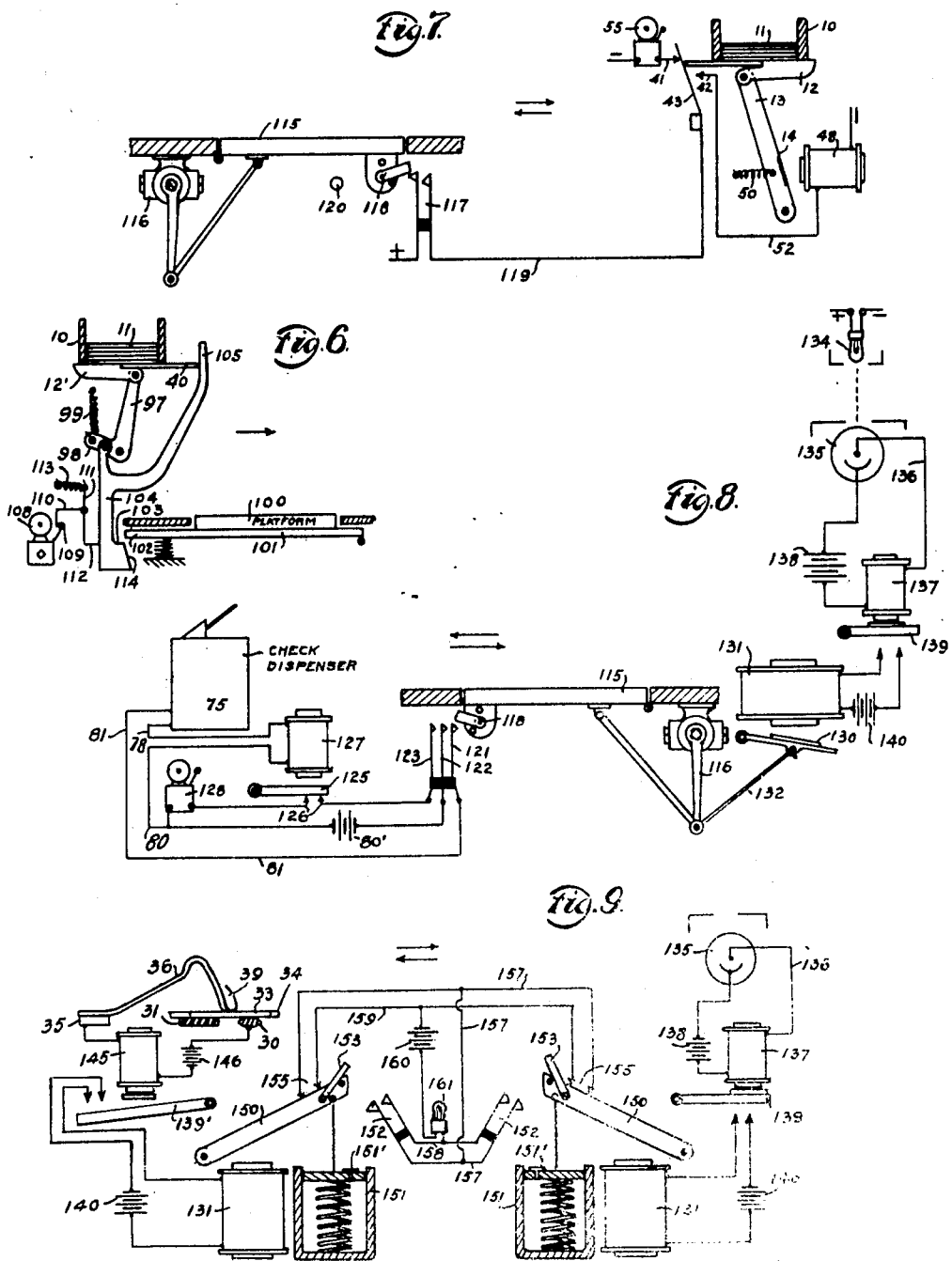
Inventor:
Howard M. Kilpatrick March 2, 1943.　　H. M. KILPATRICK　　2,312,340
CHECK CONTROLLED AND DISPENSING TURNSTILE AND OTHER DEVICE
Filed March 10, 1938　　3 Sheets-Sheet 3
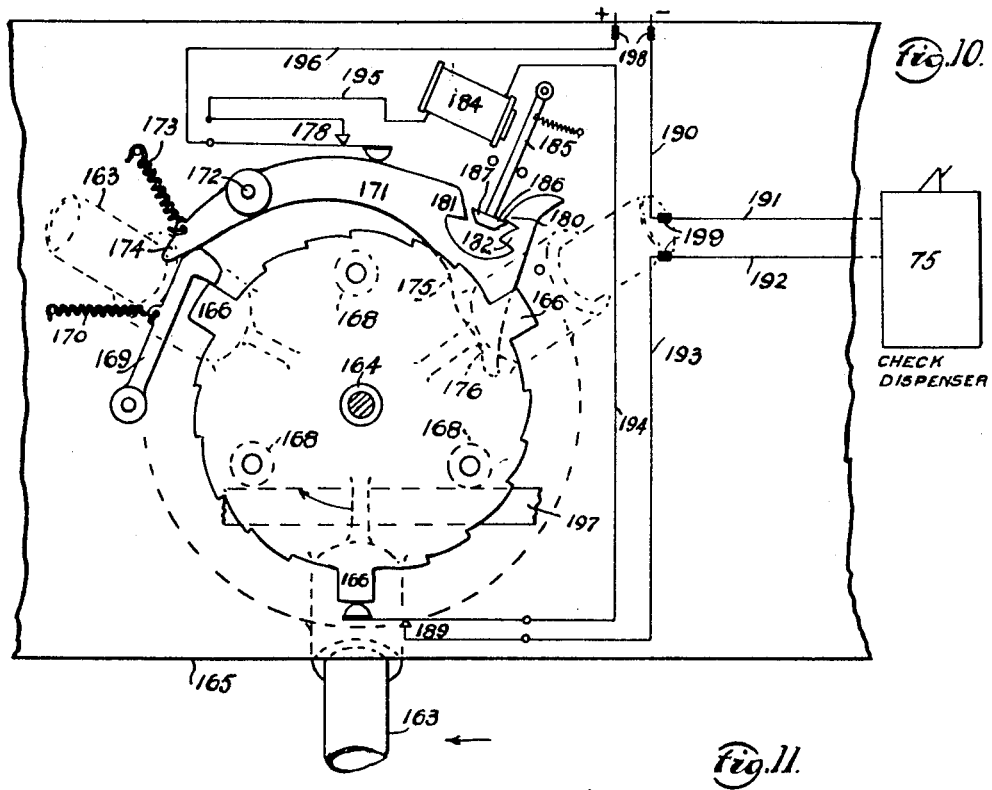
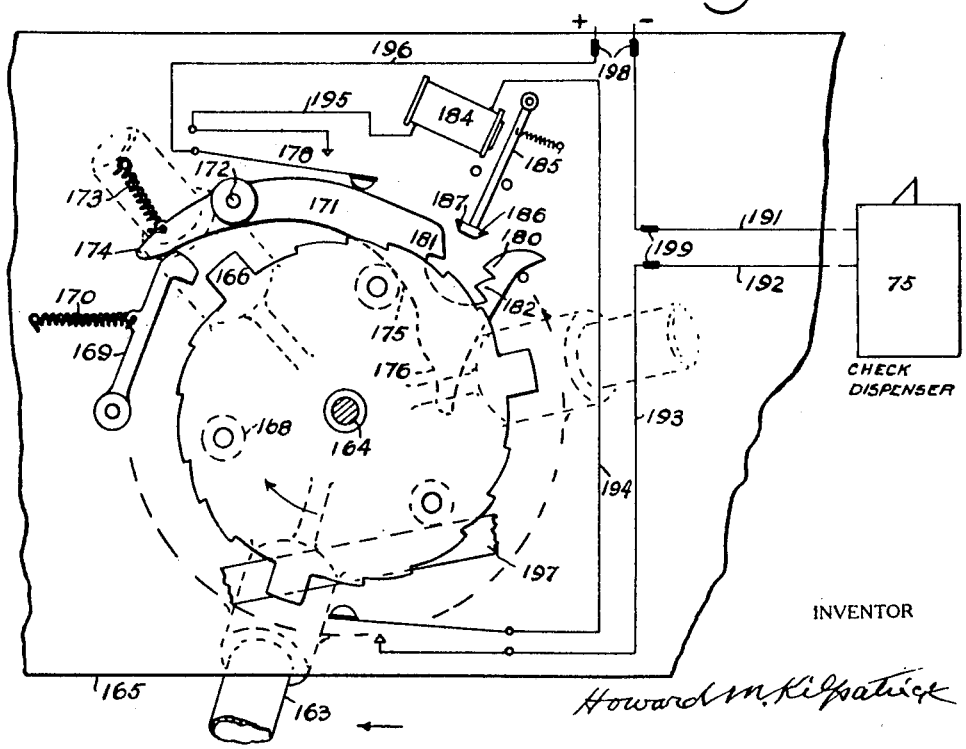
INVENTOR
Howard M. Kilpatrick Patented Mar. 2, 1943

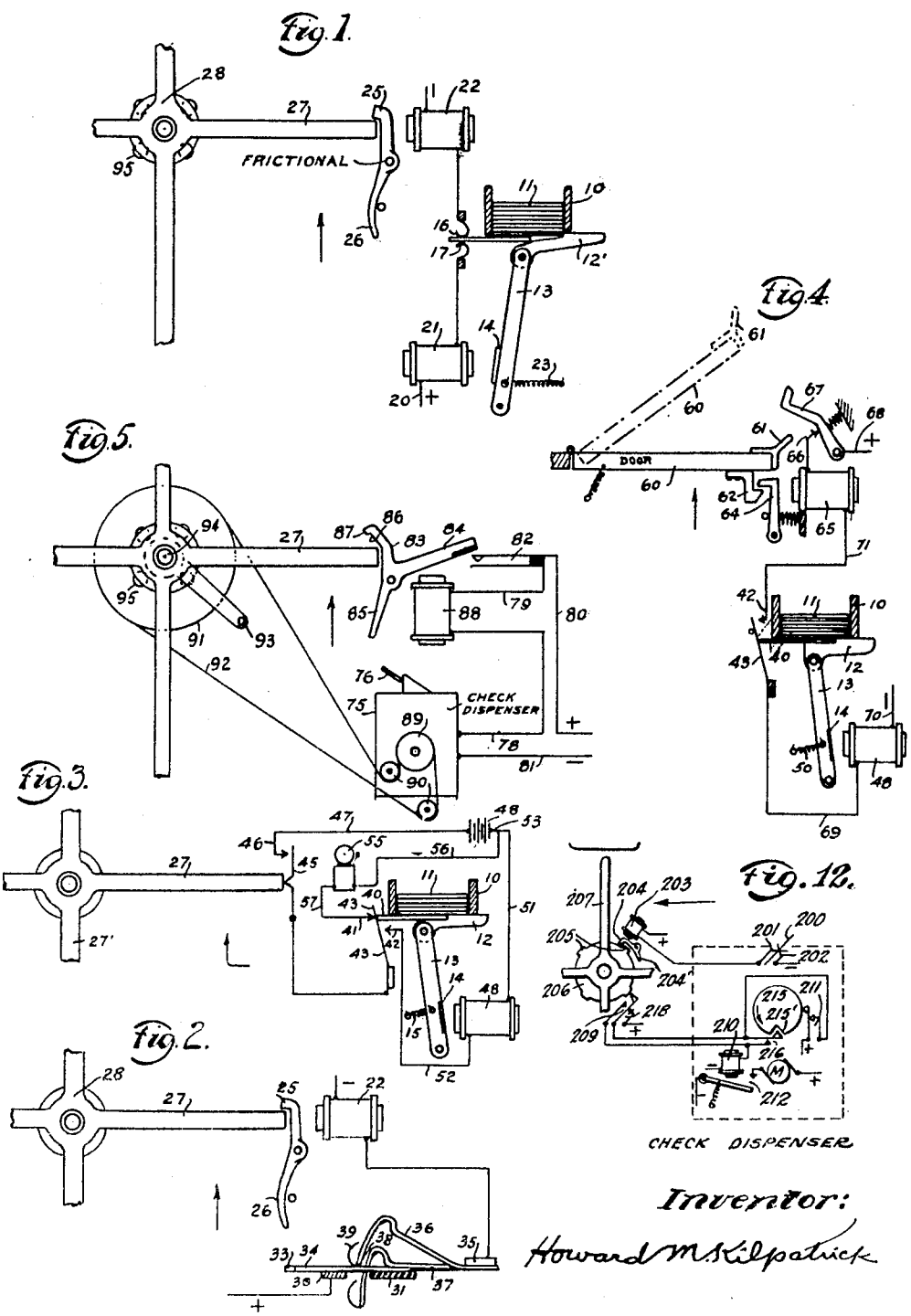

2,312,340

UNITED STATES PATENT OFFICE 2,312,340

CHECK CONTROLLED AND DISPENSING TURNSTILE AND OTHER DEVICE

Howard M. Kilpatrick, New York, N. Y.

Application March 10, 1938, Serial No. 195,188

16 Claims. (Cl. 177—311)

This invention relates to turnstile-controlled dispensing machines and devices, and relates more particularly to other forms of the invention embodied in the machine for dispensing cardboard checks and other articles shown in my copending application Serial No. 74,775, filed April 16, 1936, now Patent No. 2,204,897, dated June 18, 1940.

Many restaurants are provided with check dispensing machines placed near the entrance of the restaurant; but during rush hours, an attendant is usually stationed at the machine to hand the checks to the incoming customers and to prevent any customer from entering without receiving a check. An object of the present invention and the machine of said application is to eliminate the need of this attendant. Other objects also will appear.

To this end said application shows a machine which projects each check to a position where it may be taken away by the customer, the machine being provided with a turnstile, revolving door or other barrier which prevents the customer from entering until he has taken the check. As the customer passes through the turnstile, the machine presents another check and positions the turnstile for the next customer, holding the turnstile locked until said next customer takes away the newly presented check.

Other objects of the present invention are to provide other ways of performing the function of said machine.

Said barrier or turnstile, when locked serves as a signal or reminding means to remind the customer that he has not taken the required check; and other objects of the present invention are to provide forms of sensing means and reminding devices other than turnstiles and barriers.

While the description herein relates to checks and customer operated devices, it is understood that the invention, as claimed in the broader claims, is not limited to these, and that the device may be greatly varied in many respects without departing from the scope of the invention as defined in the broader claims.

In the accompanying drawings, Figs. 1 to 12 are diagrams showing eleven different forms of the invention, and show the dispensing devices in elevation. Figs. 1 to 5 show the control means or turnstiles in plan. Fig. 6 shows the control means in elevation. Figs. 7 and 8 show control means that may be in elevation or plan. Figs. 8 and 9 show control means in plan. Figs. 10 and 11 show different positions of the same modification of the turnstile mechanisms in plan. Fig. 12 shows the turnstile mechanism in plan, and the check dispensing connections in elevation.

In Figs. 1, 3, 4, 6, and 7, the check presenting means is similar to that shown in U. S. Patents Nos. 1,315,370, 1,438,924, 1,716,677 and comprises a magazine 10 for a stack of checks 11, a reciprocatory picker 12' or 12 for feeding sidewise from the magazine the bottom check to hold such check in position to be removed and a lever 13 for operating the picker and having an armature 14 thereon.

In the form of Fig. 1, a switch 16, 17 is held open by the projected bottom check 18 in said position and is automatically closed by the removal of such check, by the customer about to enter, thus to complete a circuit 20, 21, 22 including said switch 16, 17, and a picker operating solenoid or electromagnet 21 for attracting the armature for operating the picker 12' (against the force of the spring 23) when the circuit is complete for presenting another check into said position to be removed. A frictionally mounted latch 25, 26 having an end hook 25 to normally engaged the end of an arm 27 of the turnstile 28 and hold said turnstile against turning, and a latch operating electromagnet 22 is adapted when check is removed, by the customer, and the circuit is complete, to attract said latch hook 25 to allow the turnstile to be turned and the customer to enter.

The latch is retracted and a new card fed at the same time but because of tre frictional mounting, the latch remains retracted until the latch cam end 26 is engaged by the next stile arm on the turning of said turnstile for automatically restoring the latch to normal stile-holding position, whereupon the stile is ready for the next customer.

In the combination of Fig. 2, the turnstile 28 is as in Fig. 1, but the dispensing means comprises a pair of parallel bars, 30, 31 (shown in section) one bar 30 being an electrically conductive contact bar and the other bar 31 non-conductive. Said bars are adapted to receive thereon a group of checks 33, 34 placed thereon side-by-side by hand in position to be removed. A conductive supporting bar 35 supports spring switch arms 36, one for each check. Each arm has a downturned end 38 yieldably pressing on the check above the space between said bars and automatically operated by the downward pressure of the arm, or removal of such check, to pass between the bars. Said end is provided with a conductive weak spring extension 39 for making instantaneous contact with the conductive bar 30 only at the instant of said passing. Said bar 30 and the switch arm 36 or 37 forms a switch closed only an instant when a check is removed.

An intermediately fulcrumed frictionally mounted latch 25, 26 has an end hook 25 to normally hold said turnstile against turning; and a latch operating electromagnet 22 connected in series circuit with said switch 36, 30 is adapted when a check is removed and the circuit is complete, to attract said hook end 25 to allow the turnstile arm 27 to be turned. Said latch has a cam end 26 adapted to be engaged by the next stile arm for restoring the latch to normal stile-holding position, after the customer has passed.

In the system of Fig. 3, the check presenting means comprises a magazine 10 for a stack of checks 11 and a reciprocatory picker 12 for feeding forward the bottom check 40; a lever 13 for operating the picker having an armature 14 thereon and normally held by a spring 15 in position to hold such check in projected position ready to be removed.

A transfer switch 41, 42, 43 comprising a normally engaged contact 41, a normally disengaged contact 42, has a spring transfer contact 43 normally held by said bottom check 40 in normal position in contact with said normally engaged contact; said transfer contact being spring pressed, on the removal of such check, into contact with normally disengaged contact 42.

A spring-closed stile switch 45, 46 is normally held open by the turnstile arm 27 when the latch is in normal position, and has an element 45 connected to the transfer contact 43, and the other element 46 is connected by conductor 47 to one pole of the current source 48'. A picker-operating electro-magnet 48 attracts the armature 14 for retracting the picker against the action of the spring 50 when the solenoid is energized. Conductors 51, 52 connect the magnet between the normally disengaged contact 42 and the other pole 53 of said source, whereby when the normally disengaged contact 42 is engaged by the transfer contact, on the removal of the card 40, and said stile switch 45, 46 is closed by the turning of the stile from normal, said magnet is energized and retracts the picker. When the customer passes and the next arm 27 opens the switch 45, 46, the magnet deenergizes and the spring 50 feeds another check into said position again pushing the transfer contact from contact 42 into engagement with contact 41; but as the switch 45, 46 is open, nothing further happens.

A signal device such as an electric bell 55 is connected by conductors 56 and 57 in series between said normally engaged contact 41 and pole 53 of the source, whereby when the stile switch is closed without removing the projected check 40, the bell will ring.

In Fig. 4, the check presenting means comprises a magazine for a stack of checks and a reciprocatory picker for feeding forward the bottom check and normally spring held in position to hold such check in projected position as in Fig. 3. The card operated switch 42, 43 comprises a normally disengaged contact 42, and a spring contact 43 normally held by said check when in said projected position, out of contact with said normally disengaged contact 42. Said spring contact is biased, on the removal of such check, into contact with the normally disengaged contact.

Instead of a turnstile, as in Figs. 1 to 3, a control device such as a spring closed door 60 (shown in plan) is provided having at its free edge a projection 61 and a latch keeper 62. A latch 64 adapted to snap into the keeper holds the door closed until retracted by an electromagnet 65 to allow the door to open. A normally closed switch 66, 67 has a fixed contact 66 connected to said magnet 65, and a movable contact connected to the plus terminal 68 of a current source. A picker-operating magnet 48 attracts the armature 14 for retracting the picker against the action of the spring 50 when the solenoid is energized. Conductors 69, 70 connect the magnet 48 between the spring contact 43 and the minus pole of the source; and a conductor 71 connects the normally disengaged contact to said magnet 65, whereby when the normally disengaged contact is engaged by the transfer contact, on the removal of the card 40, while said normally closed switch 66, 67 is closed, said magnet 65 retracts the latch to allow the door to open and said magnet 48 retracts the picker; whereupon on the opening of the door, the projection 61 opens the switch 66, 67, the circuit is broken, the latch 64 released and spring 50 feeds another check into said projected position.

In the system of Fig. 5, an electro-motor-operated check dispenser 75 of the general type shown in U. S. Patent No. 1,293,974 is used to hold a check 76 in position to be removed. As shown in said patent, this dispenser has a circuit for its motor having therein a switch automatically closed by the removal of such checks 76, which closure starts the motor causing the dispenser to feed a check strip and cut off and present another check.

Said motor circuit includes conductors 78, 81; and in the present invention conductors 79, 80 are used to connect in said circuit, a normally opened stile-operated switch 82, whereby when the switch 82 and the check-controlled switch are both closed, the circuit is completed for operating the motor for presenting another check into said position to be removed. A three arm lever, 83, 84, 85 has a hook arm 83 provided with an intermediate cam 86 adapted to be engaged by the stile to move the lever a small amount. The arm 83 has an end hook 87 to hold said turnstile against turning after the lever has been thus moved, thereby to cause the arm 84 to close said stile switch 82 to complete said circuit. An electromagnet 88 in said circuit is adapted to attract said arm 84 to move said latch hook 87 to unlatching position to allow the turnstile to be turned.

An operative connection between said motor and turnstile, such as pulleys 89, 90, 91 and belt 92 and a stile-arm-engaging finger 93 fast on the pulley shaft 94, turns said turnstile automatically when said check dispenser operates to present another check, the turnstile is loose on the shaft 94 and may be turned by hand faster than the finger 93 moves. If the belt be omitted or removed, the stile may be operated by hand in the usual way. The belt may be under the floor.

The arm 85 of said lever has a blunt end adapted to engage the stile 27 for preventing the stile from being rotated as much as one arm-distance before said solenoid 88 releases the lever. The finger 93 is positioned to stop just before the arm reaches said blunt end. All the stiles are moved to final position by hand or may be moved to final position by means such as a spring pressed bar engaging with the rubber rollers 95 as shown in U. S. Patent No. 1,815,130.

All of the systems herein except Fig. 6 are in part electrically operated. But the device of said application and Fig. 6 herein are mechanical.

In Fig. 6, the check presenting means comprises a magazine 10 and a reciprocatory picker 12' as in Fig. 3, the bottom check 40 being normally spring held in projected position. A bellcrank lever 97, 98 having an upper active arm 97 for operating the picker has also a lateral motive arm 98 upwardly spring held by the spring 99 and adapted to be lowered to cause the active arm to retract the picker. An upwardly spring pressed pivoted platform 100, 101 (shown in side elevation) having a tread portion 100, has also a free extension 102 adapted at times to engage a ledge 103 of a bar 104 pending from said motive arm 98. An upwardly disposed finger 105 on said bar is adapted to be engaged by the projected check 40 normally to hold said ledge 103 from under said extension 102.

A mechanical, spring-operated bell 108 has a clapper 109 tending to vibrate but normally held from vibration by a three arm lever 110, 111, 112 having a hooked arm 110 normally holding said clapper. A spring 113 drawing another arm 111 holds the lever in the clapper holding position; and a third arm 112 presses on said bar 104 and tends to dispose said ledge 103 under said extension 102, whereby when a card is removed the ledge will move under the extension 102, and when the platform 100 is stepped upon, the extension 102 will press down said ledge and bar, retract the picker 12' and cause the feeding of another card (under the action of spring 99) when the platform is released. While the bar 104 is thus pushed rightward by the spring 113 the hook arm 110 will merely move further into engagement with the clapper and the bell will not ring.

The bar 104 is also provided with an outwardly and downwardly inclined cam 114 just below said ledge 103. This cam is adapted to be engaged by the extension 102 if the platform is stepped upon while a check 40 is in projected position, thereby to cam the bar 104 against the 112 arm, retract the hook arm 110 from the clapper and allow the bell to ring.

As shown by the arrows of Figs. 1 to 6 the systems of said figures are adapted to be controlled by customers moving in the direction of said arrows. The devices of Figs. 7 to 9 are adapted to control for customers moving first past the presenting devices and then toward the control devices as in Figs. 1 to 6 and as indicated by the lower arrows of Figs. 7 to 9. However, the systems of Figs. 7 to 9 are also adapted for customers moving first past the control device and then past the presenting device.

In Fig. 7, the control device comprises a hinged member 115, which may be a platform (in side elevation as in Fig. 6) or may be a door (in plan) as in Fig. 4. This hinged member 115 has a normal position, as shown; and a retarded closer 116 (such as an ordinary door check) slowly yieldably returns the member to normal position when removed therefrom. A normally open latch switch 117 is closed by a latch 118 pivoted on the member and adapted to close the switch only during said returning movement.

In Fig. 7 the electric bell and the check presenting means are the same as in Fig. 3. A conductor 119 connects the transfer contact to one element of the normally open switch 117, the other element of the switch 117 being connected to plus terminal, whereupon after the removal of a check, when the normally open switch becomes closed as by the returning of the member 115 to normal, the magnet 48 will retract the picker, and the spring 50 will feed another check into said position. But when the normally open switch is closed when the projected check has not been removed, the bell will ring.

Thus it will be seen that the passage of a person past said member 115 causes said member to be moved to abnormal position, whereby the passage of the person by said member without removing a check before said latch closes the latch-switch will cause the bell to give a reminder that the check has not been removed, but will withhold said reminder if the check is removed before the latch-switch is closed. The above is true whether the person passes first the member 115 and then the presenting means, or vice versa; but if the presenting means is visited first, the retarding of the closer is not necessary.

If the member 115 is a platform, a support 120 is necessary to prevent the platform moving too far downward; but if this member is a door, the support 120 must be set further back or omitted.

In Fig. 8, the member 115 may be a door or a platform as in Fig. 7 or may be merely any kind of movable member having a normal position having a retarded closer 116 slowly yieldably returning the member to normal position when the member is removed therefrom. A normally open latch-switch 121, 122 is closeable by a latch 118 on the member adapted to close said switch during said returning movement only.

In this system an electro-motor-operated check presenting means 75 as in Fig. 5' is adapted to hold a check in position to be removed and has a circuit 78, 80, 81 for said motor having therein a current source 80', a normally open switch 121, 122 and a check-operated switch automatically closed by the removal of such check, whereby when both of said switches are closed the circuit is completed for operating the motor for presenting another check into said position to be removed.

A signal switch 122, 123 is closed by said latch switch 121, 122 after (but not before) the latter is closed; and a normally closed cut-out switch 125, 126 is adapted to be opened by an electromagnet 127 in said circuit 78, 80, 81 when the circuit is energized. An electric signal means 128 connected in series circuit with said signal switch 122, 123, said cut-out switch 125, 126 and said source is adapted to be operated on operation of the latch switch when the check-operated switch of the dispenser 75 is open and the electromagnet 127 not energized. As stated said member 115 may be operated as in Fig. 7; but it may also be operated by an electrically energized sensing device having armature 130 adapted when retracted by an electromagnet 131 to operate said member 115, by means of said closer and a flexible connector 132, to said abnormal position.

The sensing device comprises a light source 134 and a photo-electric device 135 adapted to receive light from said source. A local circuit 136, 137, 138, including said device 135 has a relay 137, 139 therein adapted to hold open an intermediate circuit 139, 140, 131 when the device 135 is energized. The intermediate circuit includes the operating electromagnet 131 adapted to attract said armature; whereby the passage of a person between said device and source causes said operating electromagnet 131 to be energized, and said member 115 to be drawn to abnormal position, whereby the passage of a person between said light 134 and said device 135 without having removed or removing a check before said latch 118 closes the latch switch 121, 122 and energizes the electromagnet 127, will cause the signal means 128 to give a reminder that the check has not been removed, but will withhold said reminder if the check is removed before the latch switch 121, 122 is closed.

In the system of Fig. 9, the check presenting means is the same as in Fig. 2, said conductor bar 30 and each switch arm 36 forming a switch. An operating electromagnet 145 is connected in series circuit 145, 146 with said switch 30, 36. A spring retracted armature 139' is adapted to be retracted by said electromagnet 145 when energized as when a card is removed.

A sensing device, 135 to 139 in Fig. 9 is similar to the corresponding device in Fig. 8, and controls the local circuit 131, 139, 140, at the right of Fig. 9, which is similar to the corresponding circuit at the right of Fig. 8, which is similar to the circuit 131, 139', 140 at the left of Fig. 9. The passage of a person between said device 135 and the light source causes the right operating electromagnet 131 to be energized.

Similar spring retracted armatures 150 at the right and left of Fig. 9 are adapted to be attracted by the respective electromagnet 131.

Each of said armatures 150 comprises a hinged member having a normal position as shown; and a spring-actuated retarded dash-pot or closer 151 slowly yieldaby returns the member to normal position when removed therefrom but is provided with a valve 151' which allows quick movement of the member to abnormal position. A normally open latch switch 152 associated with each member is adapted to be closed by a latch 153 on the member during said returning movement only. Normally closed switches 155, 150 are closed by the respective members only when in normal position.

Conducting means 157 connects together one element only of each said switches 152, 155; a conductor 158 connects the other elements of the normally open switches; a conductor 159 connects the other fixed elements of the normally closed switches. A source of current 160 and an electric signal 161 are connected in series between said conductors 158, 159. Therefore, when a normally open switch 152 and a normally closed switch 155 are closed at the same time, the signal 161 will operate. The position in the travel of each hinged member 150 at which its latch 153 closes the normally open switch is nearer to its outer than its inner limit of the travel. Therefore if one lever is retracted and released while the other latch is between its outer limit and its normally open switch, both latches will have passed the normally open switches before either normally closed switch is closed, and the signal will not operate.

But if either hinged member 150 be retracted and the second member 150 be not retracted, the lamp will light when the first member latch closes its latch switch, current passing through parts 160, 161, 152, 157, 155, 159 to 160. If a first hinged member be operated and the second be not operated in time to close and open its own latch switch 152 before the first member closes its own normally closed switch 155, the lamp will light.

Therefore, the passage in either direction, of a person by said sensing device 135 without having removed or quickly removing a check, will cause the signal means to give a reminder that the check has not been removed, but will withhold said reminder if the time of the removal of the check and the time of the passage past the sensing device are near together.

It will be seen that the parts of the system of Fig. 9 are symmetrical except for the presenting and sensing devices, and that therefore the devices may be interchanged. This shows that the system may control when the customer passes in either direction. More broadly stated, if either member 150 operates, the other must operate quickly, else a signal will be given. If the members 150 are operated simultaneously or fairly nearly so, no signal will be given.

Figures 1 to 9 and matter above described in detail are copied from my copending application Serial No. 112,228 filed Nov. 23, 1936, allowed March 12, 1937, and abandoned March 12, 1938, for check controlled and dispensing turnstiles and other devices. Therefore, the present application is a continuation in part of said copending application.

In the form of the invention of Figs. 10 and 11 is shown in combination a check dispenser 75, of the type of the Sullivan Patent No. 1,293,974, adapted, when a check is removed therefrom, to allow the transmission of current therethrough until a new check is presented for removal. The turnstile may be similar to that of the Kennedy Patent No. 1,841,132, issued Jan. 12, 1932, and has arms 163 and a disk 164 rotary and fast therewith on a support 165, the disk being provided with a lug 166 and a roller 168 for each arm 164.

A latch 169 is normally engaged with a lug 166 to prevent forward movement of the turnstile and is biased by a spring 170 to release the lug, when the latch is released by an escapement lever 171 pivoted at 172 and having a released position (Fig. 11), a first position (nearest the disk), an intermediate position adjacent to the first position and a normal position (Fig. 10) between the intermediate and released position, as will be explained.

A spring 173 at times yieldably moves the lever from the first position through the other positions to the released position; and an extension 174 carried by the lever holds the latch 169 engaged with the lug during all of said positions except the released position.

Said lever has a cam edge 175, 176 normally disengaged by any roller 168, the part 175 being adapted to be engaged by a roller as the turnstile moves from one position to the next to move the lever quickly from released to normal position to close the switch 178, the roller then engaging the part 176 and slowly moving the lever to the first position as the turnstile completes, its operation. The lever 171 is provided with escapement teeth 180, 181, 182. An electro-magnet 184 has a yieldably retracted pivoted armature carrying projections 186, 187 adapted to engage said teeth, the projection 186 being adapted when the armature is attracted to disengage the tooth 182 and release the lever from first to the intermediate position, where the projection 187 catches on the tooth 181. When the armature is again retracted the projection 186 engages the tooth 180 to hold the lever in normal position. When the armature is again retracted, the projection 186 is disengaged from tooth 180 to release the lever from normal to released position.

The lever operated switch 178 is biased to open position and is closed by the lever except when the lever is released. A lug operated switch 189 is biased to open position and is closed by a lug 166 when the lug is in normal position.

Conductors 190, 191, 192, 193, 194, 195, 196 connect said dispenser 75, switches 178, 189 and the magnet 184 in series; and when the parts are all in the normal position of Fig. 10, removal of a check from the dispenser connects conductors 191, 192 and allows current flow, momentary energization of the magnet 184 and immediate release of the lever 171 and latch 169, thus immediately opening the lever operated switch 178 and the circuit before the check dispenser can present and cut off a new check. The customer can now pass through the turnstile in the direction of the lower arrow. Partial movement of the turnstile to an intermediate position opens the other switch 189 (Fig. 10) and has no effect on the already deenergized magnet 184; but complete operation of the turnstile closes the lug-operated switch 189 and causes a roller to engage the cam edge 175, 176, thus restoring the lever to first position with projection 186 caught on tooth 182 at the same time closing the lever operated switch 178 thereby completing the circuit, energizing the magnet, withdrawing the projection 186 from tooth 182 and catching projection 187 on tooth 181 to hold the lever in intermediate position while the current operates the dispenser 75 until the next check is presented and cut off and the circuit broken in and by the dispenser, whereupon the magnet becomes deenergized, and the projection 187 moves from tooth 181, and projection 186 catches on tooth 180 holding the lever in normal position, leaving the combination, with the turnstile locked, in the position of Fig. 10, ready for the next customer. The turnstile is yieldably held in normal position by the positioning bar on lever 197 as in the Kennedy patent.

It is noted that with the arrangement of Figs. 10 and 11, the novel mechanism is all in the turnstile, and in order to connect it for operation, it is only necessary to connect the conductors 190, 196 of the turnstile to the source of current 198, and then connect the dispenser conductors 191, 192 to the turnstile at the socket 199.

In the form of the invention as shown in Fig. 12 the parts 201, 202, and M, and the check feed and cut off means may be similar to that of said Sullivan Patent No. 1,293,974.

The disk 215 in the position shown could be mounted on the member D, of the Sullivan patent, when in normal position, to rotate therewith.

In this form of the device, the customer enters in the direction of the arrow, taking a check 200, closing contact 201, 202, energizing magnet 203 and releasing latch 204 from a lug 205 on the disk 206 fast on the turnstile 207. One customer may now pass, but two customers may not pass, as the tail 204' will stop the next lug 205.

When the customer has moved the turnstile a few degrees, contact is made at 209, whereupon current may pass from minus through relay magnet 210, contacts 209 and 211 to plus, energizing the relay magnet 210 and closing the motor circuit through contact 212 and the motor. The motor then operates and feeds and cuts off a new check at 200 and rotates the disk 215, which is rotatably connected to the motor operated check feed and cut off means. The disk 215 rotates once for each check fed and cut off.

After the feeding starts the disk 215 closes contact 216; and the new check 200 breaks the contact of 201, 202, allowing the latch 205 to be restored to normal, allowing the turnstile to quickly complete its normal quarter turn. The completion of the turnstile operation breaks the contact at 209, but the current passes at 216 and 211 or 218 until the check has been cut off and the disk 215 makes a complete cycle, opening the switch 216, thus cutting off all current through relay magnet 210 and therefore through the motor M. The turnstile is now ready for the next customer.

If the customer should stop the turnstile halfway, contact 218 would remain open until the cam notch 215' reached and opened contact 211, thus stopping the motor and cam before the check was cut off. Thus two checks cannot be taken before the turnstile completes. After the device has been thus stopped, the customer may complete the turnstile movement, whereupon current will pass from minus through magnet 210 and contact 218 to plus, and the cycle will be completed.

From the above, it will be noted, that the stile cannot be moved until a check is taken; the motor will not start until a check is taken and the stile pushed; the stile can complete only a quarter turn for each check; only one check may be cut off and taken for each quarter turn of the stile, and the check will not be cut off until the quarter turn is completed.

It is understood that the word "check" as used in the claims herein is not limited to restaurant checks, but covers tickets and other articles which may be presented by presenting or dispensing means.

I claim as my invention:

1. In combination, a signal means; a sensing means remote from the signal means adapted to sense the passage of a person; a check presenting means adapted to hold a check in position to be removed; and means cooperating with the signal and presenting means, a check when in said position and said sensing means during said sensing, to automatically cause said signal to operate.

2. In combination, a barrier; a check presenting means normally holding a check in projected position; a transfer switch comprising a normally engaged contact, a normally disengaged contact, and a spring transfer contact normally held by the projected check in contact with the normally engaged contact; said transfer contact being spring pressed, on the removal of such check, into contact with normally disengaged contact; a barrier-operated switch normaly held open by the barrier; an electro-magnetic check feeding means for projecting the checks, when energized; conductors connecting the electro-magnetic means, the normaly disengaged contact, and the barrier-operated switch in series circuit whereby when the normally disengaged contact is engaged by the transfer contact, and said barrier-operated switch is closed, said electro-magnetic means feeds another check into said position; and an electric signal means connected in series with said normally engaged contact, and therefore in series circuit with the transfer contact and barrier-operated switch, whereby when the barrier is operated without removing the projected check, the signal means will operate.

3. In combination, an article holding means; a bell; and means adapted to operate said bell if a person attempts to pass the article holding means, while the article is therein, without taking an article and to withhold the bell from operation if the article is taken.

4. In combination, an article holding means for holding an article in position to be grasped and pulled from said position; a switch held in one condition by said article in said positon and movable from said condition if the article is grasped and pulled from said position; a source of current; a solenoid; circuit means for connecting said switch, solenoid and source in series; a barrier at all times adapted to be moved to permit the passage of a person; and cooperating means controlled by said solenoid, when the article has not been removed from said position, and said barrier when the barrier has been, after the passage of a person, moved to normal position, and is pushed against, to give a predetermined signal, and to withhold said signal if the article is pulled from said position just before the barrier is pushed against.

5. In a combination as in claim 4, means set in operation by the removal of the article and the operation the barrier in passing a person and restoration to normal, for placing another article in said position and restoring the cooperating means into condition to be operated to cause another signal.

6. In combination, an article holding means for holding an article in position to be grasped and pulled from said position; a person passing means providing passage space at all times adapted to permit the passage of a person; and electric circuit means controlled by said article when the article has not been removed from said position, and a person moving to a predetermined position in said space to give a predetermined signal, and to withhold said signal if the article is pulled from said position just before the person moves to said predetermined position.

7. In a combination as in claim 6, means set in operation by the removal of the article and the passage of a person through said space for placing another article in said position and restoring the circuit means to condition to be operated to cause another signal.

8. In combination, holding means for holding a plurality of articles with one article in position to be grasped and pulled from said position; a switch held in a normal condition by said one article in said position and movable to an abnormal condition if said one article is grasped and pulled from said position; a source of current; a solenoid; circuit means for connecting said switch, solenoid and source in series; a barrier adapted to be moved to permit the passage of a person; cooperating means controlled by said solenoid, said switch in said normal condition, and said barrier when the barrier has been, after the passage of a person, moved to normal position, and is pushed against, to give a predetermined signal, and to withhold said signal if the article is pulled from said position and said switch is moved to said abnormal condition just before the barrier is pushed against; and feed means set in operation by the switch in the abnormal condition and the operation the barrier in passing a person and restoration to normal, for placing another one of said plurality of articles in said position and restoring the cooperating means into condition to be operated to cause another signal.

9. In combination, an article holding means for holding a plurality of articles with one article in position to be grasped and pulled from said position; a person passing means providing passage space to permit the passage of a person; a signal means remote from said space; electric circuit means controlled by said one article when the article has not been removed from said position, and a person moving to a predetermined position in said space to operate said signal means, and to withhold said operation if the article is pulled from said position just before the person moves to said predetermined position.

10. In a combination as in claim 9, means set in operation by the removal of the article and the passage of a person through and from said space for placing another one of said articles in said position and restoring the circuit means to condition to again operate the signal means.

11. In combination, an article holding means for holding a plurality of articles with one article in position to be grasped and pulled from said position; a switch held in one condition by said article in said position and movable to abnormal condition if the article is grasped and pulled from said position; a source of current; a solenoid; circuit means for connecting said switch, solenoid and source in series; a barrier adapted to be moved to permit the passage of a person; cooperating means controlled by said solenoid, when the article has not been removed from said position, and said barrier when the barrier has been, after the passage of a person, moved to normal position, and is pushed against, to give a predetermined signal, and to withhold said signal if the article is pulled from said position just before the barrier is pusher against; and means set in operation by the removal of the article and the operation the barrier in passing a person and restoration to normal, for placing another article in said position, only after the barrier is restored to normal, and restoring the cooperating means into condition to be operated to cause another signal.

12. In a combination as in claim 9, said passage space being at all times free of any structure.

13. An apparatus comprising, an article holding means holding articles therein normally removable one at a time entirely away from any part of the apparatus; a person passing means providing passage adapted at all times to permit the passage of a person whether the article is or is not in the holding means; a signal; and means causing a person passing through the passage space while an article is in the holding means to operate the signal.

14. In combination, an article holding means for holding card board articles therein; a person passing means adapted to permit the passage of a person whether an article is or is not in the holding means; a signal; and means adapted to operate said signal if a person passes the article holding means, while the article is therein, without taking the article and to withhold the signal from operation if the article is taken.

15. In combination, an article holding means adapted to hold an article in position to be removed; a person passing means near the holding means adapted at all times to permit the passage of a person; a signal means; and means cooperating with the signal means, an article in said position in the holding means and a person passing through the passage space without taking said article from said position, to operate the signal; said space being adapted for the passage of the person whether the article is in said position or not.

16. In combination, a holding means adapted to hold an article in position to be removed; and an audible signal means set in operation by the passage of a person by the holding means without removing the article, thereby to inform an attendant not seeing the passage that such passage has been made.

HOWARD M. KILPATRICK.